United States Patent [19]

Cecere

[11] Patent Number: 5,595,266
[45] Date of Patent: Jan. 21, 1997

[54] BONDING A FRICTION MATERIAL BRAKE LINING ELEMENT TO A METALLIC BACKING PLATE ELEMENT

[75] Inventor: James A. Cecere, Stephens City, Va.

[73] Assignee: Wagner Electric Corporation, Houston, Tex.

[21] Appl. No.: 494,803

[22] Filed: Jun. 26, 1995

[51] Int. Cl.$^6$ .................................................. F16D 69/00
[52] U.S. Cl. .................................. 188/251 A; 188/250 G
[58] Field of Search ........................... 188/251 A, 251 R, 188/250 G, 250 B; 192/107 R, 107 M; 523/152

[56] References Cited

U.S. PATENT DOCUMENTS

| 4,187,133 | 2/1980 | Yamamoto et al. | 188/215 A X |
| 4,694,937 | 9/1987 | Jonas | 188/251 A X |
| 5,254,639 | 10/1993 | Gardziella et al. | 188/251 A X |
| 5,383,963 | 1/1995 | Kobayashi et al. | 188/251 A X |

Primary Examiner—Lee W. Young
Attorney, Agent, or Firm—Thomas S. Baker, Jr.

[57] ABSTRACT

A friction brake subassembly is provided with a metallic backing plate element and with a friction material brake lining element integrally adhered to the backing plate element, the brake lining element friction material composition comprising friction material particles and an epoxy resin binder preferably in the approximate range of from 10% to 40% of the friction material composition total weight. Methods are disclosed for integrally bonding the brake lining element to the backing plate element.

3 Claims, 1 Drawing Sheet

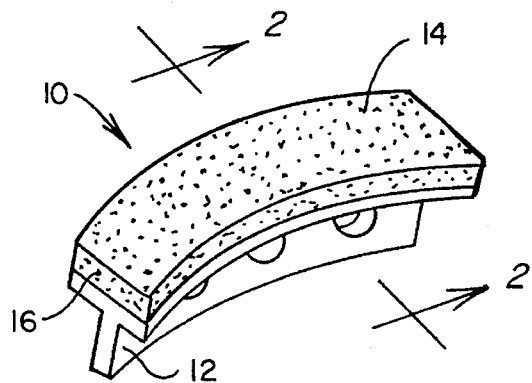
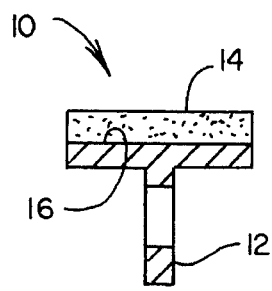
FIG. 1
FIG. 2
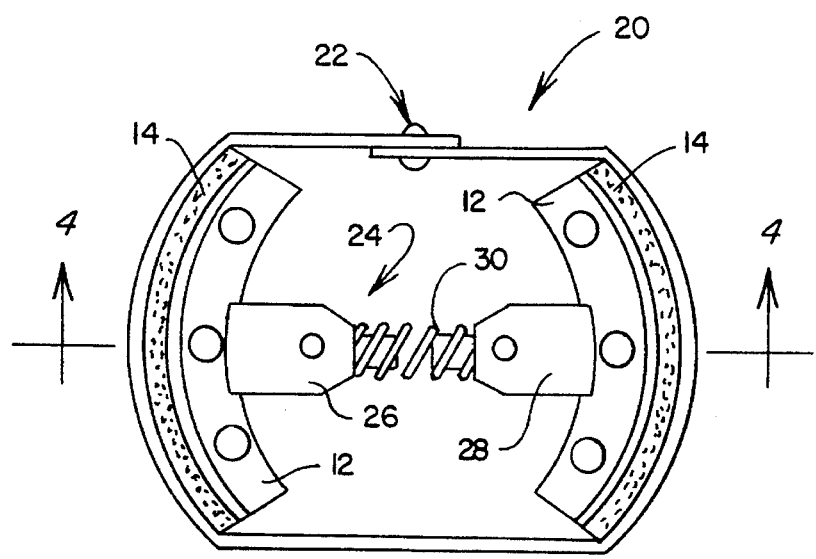
FIG. 3
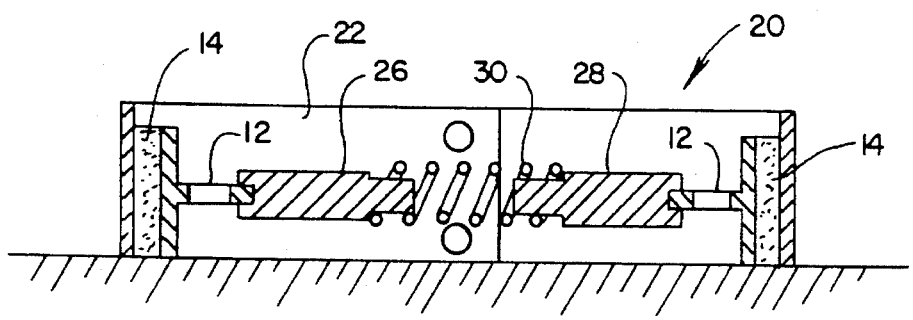
FIG. 4

5,595,266

BONDING A FRICTION MATERIAL BRAKE LINING ELEMENT TO A METALLIC BACKING PLATE ELEMENT

FIELD OF THE INVENTION

This invention relates generally to friction brakes, and particularly concerns a novel friction brake composition and methods for making friction brake subassemblies such as brake shoes and brake pads using the novel friction brake composition.

BACKGROUND OF THE INVENTION

Heretofore it has been a common industrial practice in the United States to manufacture friction brakes subassemblies such as the friction brake shoes and friction brake pads typically utilized in automotive vehicle brake systems to first form a friction material particulate mixture having an included phenolic resin binder into a cured brake lining shape of specific configuration and afterwards join the cured brake lining shape to a cooperating brake member backing plate by mechanical fasteners such as rivets or by a suitable adhesive such as a cured phenolic resin, a cured elastomeric rubber, or a like adhesive. The friction material particulate mixture cured brake lining shape is typically constituted of inorganic compound particles, organic compound particles, metallic particles, reinforcing fibers, and sometimes carbon particles, in addition to the phenolic resin binder.

Another form of conventional friction brake member, sometimes referred to as an integrally molded brake shoe or integrally molded brake pad, is manufactured using a method wherein the required adhesive material is applied to the brake subassembly backing plate element in its uncured condition and the friction material brake lining with phenolic resin binder is placed in contact with the applied uncured adhesive. The adhesive material is subsequently cured simultaneously with the necessary curing of the brake lining friction material particulate composition mixture.

I have discovered that both the need for multi-step resin curing processes and the need for separate particle binder resin and adhesive resin systems can be avoided in the manufacture of friction brake subassemblies to economic advantage by utilizing a friction material composition wherein the included uniformly dispersed resin binder system functions satisfactorily both as a composition particle binder and as an adhesive joining the brake lining cured composition to its brake backing plate element.

Other advantages of my invention will become apparent during a careful consideration of the detailed information which follows.

SUMMARY OF THE INVENTION

The friction brake subassembly of this invention is basically comprised of a metallic backing plate element, generally in the form of a rigid, metallic (low-carbon steel) member of suitable configuration and size, and a cured brake lining friction material integrally joined to the backing plate element. The brake lining cured friction material typically is comprised of particles such as organic material particles, inorganic compound particles, and metallic particles, and of reinforcement fibers, uniformly dispersed and embedded in a cured epoxy resin binder comprising approximately from 10% to 40% by weight of the total friction material composition. In some instances the brake friction material composition also may include a carbonaceous particles constituent.

From a method or manufacturing process standpoint, the preferred friction material composition, following mixing and forming into a brake lining pre-form shape while remaining in an plastic condition, is placed in compression-forming apparatus in direct contact with a cooperating backing plate element. Next, the partially cured brake lining pre-form and backing plate element are pressed together and heated in the incorporating apparatus at elevated pressures and temperatures for sufficient time to form a friction brake subassembly having the partially-cured friction material integrally adhered to the backing plate element and fully cured. The completed friction brake subassembly with adhering friction material is then removed from the mold cavity and subjected to optional subassembly finishing operations.

Additional information regarding the invention is provided in the drawings, detailed description, and claims which follow.

DESCRIPTION OF THE DRAWINGS

FIG. 1 is a perspective view of a preferred embodiment of a friction brake subassembly manufactured in accordance with the present invention and having a representative drum brake shoe configuration;

FIG. 2 is a sectional view taken at the plane defined by intersecting lines 2—2 of FIG. 1;

FIG. 3 is a plan view taken of one form of compression forming apparatus utilized in the practice of the present invention with the subassembly of FIG. 1 positioned therein; and FIG. 4 is a sectional view taken along line 4—4 of FIG. 3.

DETAILED DESCRIPTION

FIG. 1 illustrates a friction brake shoe subassembly 10 incorporating the essential features of this invention and having a representative configuration of an automobile drum brake shoe subassembly as distinguished from an automobile disc brake pad subassembly to which the invention has equal application. As shown in FIG. 1, subassembly 10 is comprised of a metallic backing plate element 12 with integral reinforcing rib, usually fabricated of a low-carbon steel, and a cured friction material brake lining 14 integrally adhered to the exterior cylindrical surface 16 of backing plate element 12. It should be noted that subassembly 10 does not utilize mechanical fasteners such as rivets or the like to join the cured friction material to back plate element 12 and similarly does not utilize an intermediate layer of adhesive composition to join those components together. See FIG. 2 which illustrates, in section, the direct or integral bonding of brake lining element 14 to element 12.

The friction material of brake lining 14 is processed to a fully-cured condition in place and typically is comprised of a mixture of inorganic particles, organic particles, metallic particles, and fiber particles combined with a uniformly dispersed epoxy resin which functions to both bind the particulate materials together and adhere the cured composition of element 14 to the subassembly 10 backing plate element 12. For the purpose of the present invention I find that the epoxy resin constituent should comprise on a weight basis approximately from 10% to 40% of the composition total weight. Such range essentially equates to a volumetric range basis of approximately 13% to 53%.

In formulating friction material composition for brake lining element 14 I normally select inorganic particles selected from the group comprised of alumina particles, magnesia particles, silica particles, aluminum silicate particles, and various mineral particles including calcium carbonate particles, barium compound particles (barite particles), and rottenstone (siliceous limestone) particles. In the composition category of organic particles generally I select a material or materials from the group which consists of rubber tire peel particles and cashew nut shell particles.

Generally, the friction composition metallic particles constituent is most often selected from the group comprised of iron oxide powder and iron particles. On occasion it may be desirable to utilize particles of one or more different non-ferrous metals.

The fiber constituent or constituents preferred in the practice of the present invention are generally selected from the group comprised of glass fibers, steel wool fibers, ceramic fibers, and polyacrylonitrile fibers. If, as suggested above, it is desirable to include a carbon constituent to develop an inherent lubricating quality in the composition, such may be obtained by incorporating one or more of the different carbon particulates which comprise the group consisting of natural graphite particles, synthetic graphite particles, coke particles, carbon black particles, and even coal particles.

Most importantly, the required epoxy resin constituent is preferably an epoxy resin system which because of its liquid epoxy resin constituent develops a plastic quality in the composition upon complete mixing of the composition particulate constituents with the composition binder. In at least one actual embodiment of the present invention I have found it advantageous to utilize an epoxy resin binder comprised of both epoxy cresol novolac resin particles and bisphenol F/epichlorohydrin epoxy resin liquid. Such resins were combined in relative proportions which imparted to the friction brake material composition mixture, following combination of the epoxy resin with the other friction brake material constituents, a degree of composition plasticity which permitted the resulting material to be subsequently rolled or extruded to shape prior to final curing. (It should be noted that from a procedural standpoint the composition particulate epoxy resin constituent was thoroughly mixed with the other composition particulate ingredients prior to addition of the liquid epoxy resin constituent).

The following Table I provides specific composition or formulation information for two different friction brake materials which have been used in the practice of the present invention (all proportions are given on a percentage weight basis):

TABLE I

| CONSTITUENT | SYSTEM 139 | SYSTEM 140 |
| --- | --- | --- |
| Organic Particles | 15.72 | 19.10 |
| Inorganic Particles | 46.61 | 44.75 |
| Metallic Particles | 2.76 | 2.65 |
| Fiber Particles | 9.46 | 9.08 |
| Epoxy Resin | 24.42 | 25.45 |
| TOTAL | 100.00 | 100.00 |

FIG. 3 illustrates a compression-type forming apparatus 20 which may be utilized advantageously in the practice of the present invention to join two pre-cured friction material extruded or rolled brake lining pre-forms 14 to a pair of backing plate elements 12. Apparatus 20 is basically comprised of an "endless" loop or band component 22, preferably fabricated of a flexible, strip-like steel material, and of a cooperating expander component 24. Expansion component 24, in turn, is essentially comprised of a spaced-apart pair of rigid adaptor elements 26 and 28 joined by a conventional compression spring element 30. Apparatus 10 basically functions to compress each partially cured friction material pre-form 14 placed in apparatus 20 between band component 22 and its respective brake backing plate element 12 when elements 26 and 28 are engaged with backing plate elements 12 and compression spring 30 is released from its compressed apparatus installation condition. As will be later indicated, compression spring element 30 is sized to develop a pressure in the approximate range of 20 pounds per square inch to 50 pounds per square inch throughout each of the friction material pre-forms 14 placed in apparatus 20 to complete the curing of the included epoxy resin binder.

Although not illustrated in the drawings, it is necessary to place a strata of separation material such as polytetrafluoroethylene ("Teflon") tape between that portion of the interior surface of band element 22 that would otherwise contact any partially-cured friction material composition and the cooperating friction material. Alternatively, a thin high-temperature material such as aluminum foil may be utilized if subsequent processing of the completed subassembly be involves the grinding or other removal of friction material surface material.

Each assembly of apparatus 20 and an included pair of partially completed brake shoe subassemblies 10 is subsequently heated to elevated temperatures (e.g., temperatures in the approximate range of from 300° F. to 500° F.) for an extended period of time generally in the approximate range of from 2 hours to 10 hours to complete the curing of the epoxy resin binder constituent dispersed throughout the friction material of pre-forms 14. Drum brake shoe subassemblies heretofore fabricated in accordance with the present invention utilizing process parameters within the ranges specified have developed material-to-backing plate bond shear strengths in the range of 1900 pounds per square inch to 2400 pounds per square inch depending on the pressure applied to the friction material composition by apparatus 20 during the prolonged cure cycle. Such values are typical of those obtained when bonding either fully-cured or partially-cured friction composition brake linings or brake lining preforms onto backing plates using a rubber-modified phenolic brake lining adhesive.

In addition to eliminating the need for a bonding adhesive, the use of an epoxy resin system as a matrix binder has an additional benefit. The curing reaction of an epoxy resin is a ring-opening polymerization and, as such, produces no volatiles. Therefore, the friction material can be applied directly to the backing plate element immediately after it is mixed and without the need for a time- and energy-consuming drying operation before curing. This is in direct comparison to the cure of a phenolic resin binder which is a condensation reaction and, as such, releases volatiles which must be carefully removed during a drying cycle to prevent the formation of blisters and delaminations in the resulting cured brake lining.

Other materials, component shapes, and component sizes than those detailed in the drawings and descriptions of this application may be utilized in the practice of my invention without departing from the scope of the claims which follow.

I claim as my invention:

1. A resin bonded friction brake subassembly, which comprises:

a metallic backing plate element having a lining surface; and a substantially homogeneous friction material brake lining element having a rod braking surface and a bottom surface comprised of a cured epoxy resin matrix and friction material particles embedded in the cured epoxy resin matrix, said substantially homogeneous friction material brake lining element bottom surface being directly adhered to said lining surface of said metallic backing plate element by said brake lining element cured epoxy resin matrix such that said substantially homogeneous friction material brake lining element extends from said backing plate element lining surface to said top braking surface.

2. The resin bonded friction brake subassembly defined by claim 1 wherein said cured epoxy resin matrix comprises approximately 10% to 40% of the weight of said friction material lining element.

3. The resin bonded friction brake subassembly defined by claim 1 wherein said cured epoxy resin matrix is the polymerization product of a particulate epoxy cresol novolac resin and a liquid hisphenol F/epichlorohydrin epoxy resin.

* * * * *